United States Patent [19]

Clark

[11] 4,318,511
[45] Mar. 9, 1982

[54] MATERIAL SPREADER DEVICE

[76] Inventor: Donald Y. Clark, R.R. #1, Central City, Merrick County, Nebr. 68826

[21] Appl. No.: 192,763

[22] Filed: Oct. 1, 1980

[51] Int. Cl.³ .............................................. B65G 65/32
[52] U.S. Cl. ..................................... 239/684; 414/301
[58] Field of Search ................ 414/301; 239/665, 681, 239/684, 687, 688

[56] References Cited

U.S. PATENT DOCUMENTS

| 3,045,840 | 7/1962 | Donnelson, Jr. | 239/687 X |
| 3,620,390 | 11/1971 | McKinnon | 239/687 X |

FOREIGN PATENT DOCUMENTS 688614  6/1964  Canada .................................. 239/687

*Primary Examiner*—Andres Kashnikow
*Attorney, Agent, or Firm*—Henderson & Sturm

[57] ABSTRACT

A material spreader for the uniform distribution of granular material beneath the spreader by broadcasting the material through outlets formed within a rotating pan. The spreader has a funnel-shaped chute to receive material and direct it into the pan under the force of gravity. The pan has a flat-bottomed surface and vertical walls with outlets formed in its corners. Vanes are provided which extend the sides of the pan in a direction away from the center of the pan, thereby increasing the horizontal velocity of the material leaving the pan outlets. Baffle plates throttle the passage of material through the outlets in the corners of the pan, aiding the momentary retention of material in the pan to assure that substantially equivalent amounts of material exit each corner of the pan. Secondary outlets of adjustable size are provided in the bottom of the pan to allow material to exit nearly vertically. The horizontal throw of the pan may be varied by changing its rotational speed and by reversing its direction.

11 Claims, 7 Drawing Figures

MATERIAL SPREADER DEVICE

BACKGROUND OF THE INVENTION

1. Field of the Invention

The present invention relates generally to devices for spreading or broadcasting granular material in a uniform manner, more particularly to a grain or silage spreader for distributing grain or silage evenly within a grainery or silo for the proper curing and storage of the material.

2. Description of the Prior Art

The practice of storing grain or silage in enclosed bins is well known in the farming and grain industries. Depositing the grain in a layer of uniform depth in the bin is essential to allow heated air to pass evenly through the grain is desired to effectively dry the grain. To the extent the level of the deposited grain is not uniform throughout, the chances for spoilage increases. Typically, grain or silage is delivered to an opening in the top of the grain bin by an auger or elevator. A grain spreader positioned below the opening in the bin can greatly reduce or eliminate the need for leveling the grain within the bin by hand.

There are many spreaders which attempt to solve this problem. Most of these spreaders have a funnel-shaped hopper and a motor driven thrower plate. Many of these devices throw grain in a single direction at any one instant, theoretically spreading the grain evenly as the plate rotates. However, since it is desirable to load the grain as fast as possible and since it is expensive to elevate the grain any higher than is necessary to inject it through the top of the bin, the grain usually enters the hopper at a rapid rate and at a distinct angle from the vertical. Regardless of how much the grain is slowed down or bounced around by the spreader, some of its entering horizontal momentum resides when it leaves the thrower plate. So long as the spreader is symmetrical in configuration, grain entering at an angle will exit at an angle. Newton's *Laws of Motion* IV.

Neither of the solutions suggested by the above discussion are practical. To direct the grain into the hopper at a vertical angle, would require that it first be elevated to a considerable additional height for that purpose alone. To shape and size the hopper so that it would temporarily store the grain thus stopping it in transit, and thereby allowing it to drop vertically on to the thrower plate, would require a hopper of huge size in order not to materially slow down the rate of receiving grain.

SUMMARY OF THE INVENTION

The invention includes a storage-thrower pan which may be cut and formed from a single square piece of sheet metal and which has outlets at each of four corners for dispersing the granular material as the pan rotates. The pan spins on a shaft which is suspended from a funnel-shaped receiver chute, which in turn is suspended from an opening in the apex of the coned roof of a storage and drying bin. Vertical baffles in front of the corner outlets in addition to the four vertical sides of the pan serve to confine the grain, before it is "thrown" a sufficient length of time to substantially abort its motion and hence its horizontal momentum, thus permitting the centrifugal force upon the grain created by the spinning pan to act upon its substantially equally in all directions. In addition, the invention includes provisions for varying the velocity and spread pattern of the spreader in order that not only will there not be uneven dispersion circumferentially around the bin, but also in order that a constant depth radially from the bin center may be substantially maintained. These provisions include the ability to spin the pan at various speeds, the ability to reverse the direction of spin in order that restraining vanes of different length located on either side of the pan outlets may serve to broadcast the grain different distances radially, respectively. Several types of adjustable openings in the pan floor assist in depositing grain beneath the spreader as required.

An object of the present invention is the provision of an improved grain spreader.

Another object is to provide a grain spreader which will more evenly distribute material circumferentially regardless of how and where the material is deposited into the receiver chute.

A further object of the invention is the provision of controls over the radial distance of throw of the grain spreader.

Still another object is to provide for controlled deposit of material substantially beneath the spreader pan.

A still further object is to provide for even radial distribution when the material previously deposited has reached various elevations.

Yet another object is the provision of a grain spreader which is of simple, durable construction and which is economical and dependable in operation.

Other objects, advantages, novel features of the present invention will become apparent from the following detailed description of the invention when considered in conjunction with the accompanying drawings.

DESCRIPTION OF THE PREFERRED EMBODIMENT

Figure 2:
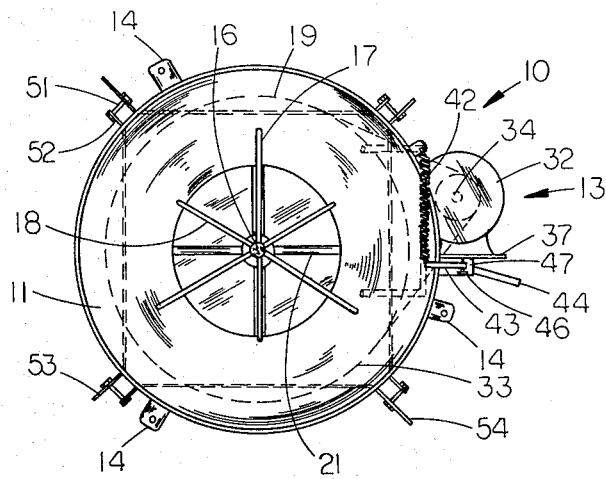
FIG. 2 is a top view of the invention.
Figure 1:
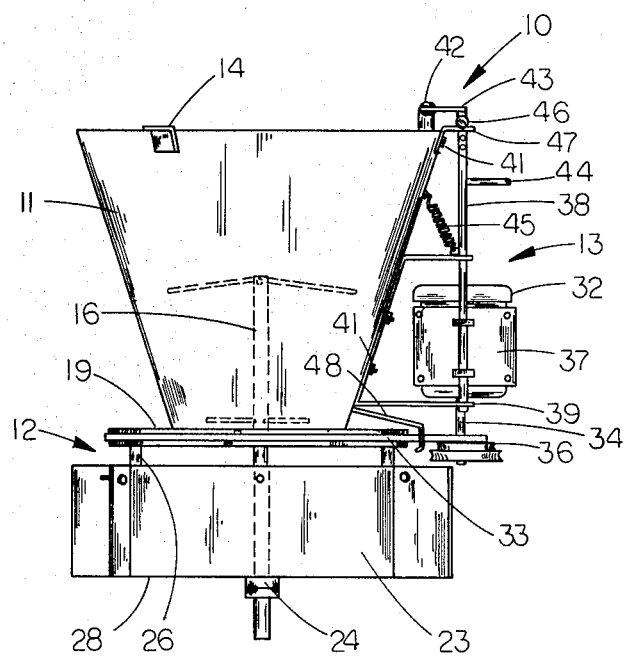
FIG. 1 is an elevational view of the invention showing the motor off to one side.

Referring now to the drawings wherein like reference numerals refer to like parts throughout the several views, and more particularly to FIGS. 1 and 2, grain spreader 10 is shown as comprising a funnel-chute 11, thrower pan assembly 12 and adjustable turning mechanism 13. Funnel-chute 11 is suspended below a top opening in a conventional cylindrical grain bin by mounting brackets 14. Main shaft 16 which runs vertically through the center of chute 11 and extends below it is affixed thereto by upper funnel spider 17 and lower funnel spider 18. Spiders 17 and 18 are comprised of metal rods affixed by welds, screws or bolts to main shaft 16 and chute 11.

Figure 6:
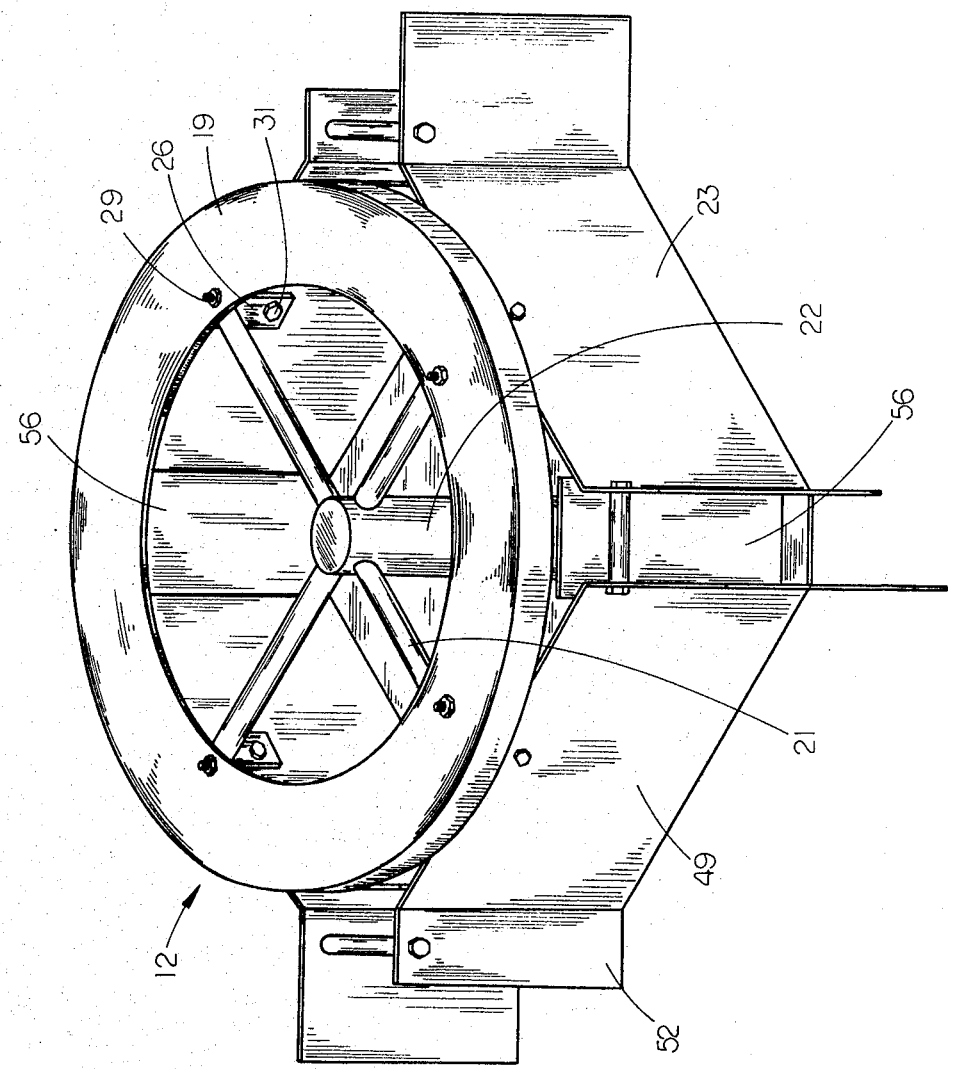
FIG. 6 is a top perspective view of the spreader pan and pulley assembly when removed from the invention.

Directly beneath chute 11 and positioned to rotate on main shaft 16, is thrower pan assembly 12. Thrower pan assembly 12, as can best be seen in FIG. 6, is comprised of pulley 19, pan spider 21, upper bearing 22, pan 23, and thrust bearing 24 (see FIG. 1). Pulley 19 is rigidly affixed to pan 23 by a plurality of pan mount plates 26. After extending below chute 11 and then through upper bearing 22, main shaft 16 first passes through aperture 27 (see FIGS. 3 and 4) in the center of pan bottom 28 of pan 23 before being rotatably affixed to thrust bearing 24. Thrust bearing 24 serves to support thrower pan assembly 12 just below funnel chute 11 and screw and nut sets 29 and 31 secure pulley 19 to thrower pan assembly 12 through mounting plates 26, respectively.

Adjustable turning mechanism 13 has as its main element motor 32 which is operatively connected with thrower pan assembly 12 through pulley 19 by belt 33. Drive shaft 34 which depends from motor 32 has affixed thereto drive wheel complex 36, comprising three concentric pulleys, each of a different size. By switching belt 33 from one size pulley of drive wheel complex 36 to another size pulley thereof, to be accomplished as explained below, the speed of thrower pan assembly 12 can be varied as desired. Motor 32 is also equipped to operate in both a forward and reverse direction to further vary the pattern of throw of thrower pan assembly 12 as will be explained below.

The selection of one of the wheels on drive wheel complex 36 is made possible by the manner in which motor 32 is mounted to chute 11. Motor 32 is affixed to motor base 37 which in turn is rigidly affixed to motor support shaft 38. Motor support shaft 38 is received through apertures in the ends of motor mount 39 and in bracket 47, permitting motor support shaft 38 to both rotate and move vertically within motor mount 39 and bracket 47. Motor mount 39 and bracket 47 are attached to chute 11 by motor mount bolts 41.

Tension spring 42 acts upon horizontal lever arm 43 which is affixed normal to the top of motor support shaft 38, by welding or the like, to keep the tension on belt 33 constant by forcing drive wheel complex 36 away from pulley 19. Any of the different sized pulleys of drive wheel complex 36 may be employed with pulley 19 by moving motor 32 vertically with manual lift handle 44. Spring 45 facilitates the raising and lowering thereof. The desired pulley of drive wheel complex 36 is maintained in alignment with pulley 19 by the insertion of pin 46 through one of the three holes, vertically spaced in equivalence with the pulleys of drive wheel complex 36, provided in and near the top of motor support shaft 38, so that pin 46 will rest on the horizontally projecting portion of bracket 47.

As illustrated in FIG. 1, belt 33 is co-acting with the smallest of the pulleys on drive wheel complex 36, thus causing thrower pan assembly 12 to rotate at its slowest speed.

Belt retainer 48 is provided to maintain belt 33 on pulley 19 when motor 32 is held inwards for the purpose of relieving the tension in spring 42 preparatory to changing the speed of thrower pan assembly 12. Belt retainer 48 comprises a rod affixed at both ends to chute 11 which has a U-shaped center portion the vertical elements of which prevent belt 33 from springing open when it is not under tension.

Figure 3:
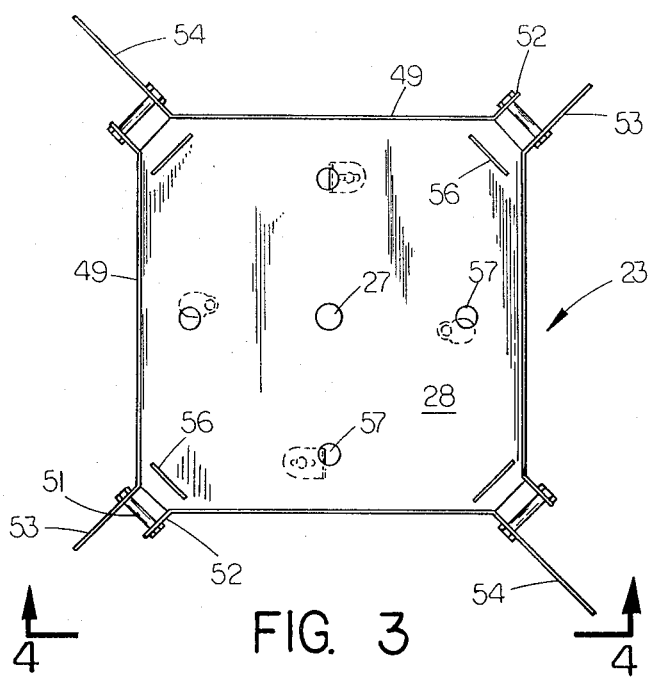
FIG. 3 is a top view of the spreader pan when removed from the invention.
Figure 4:
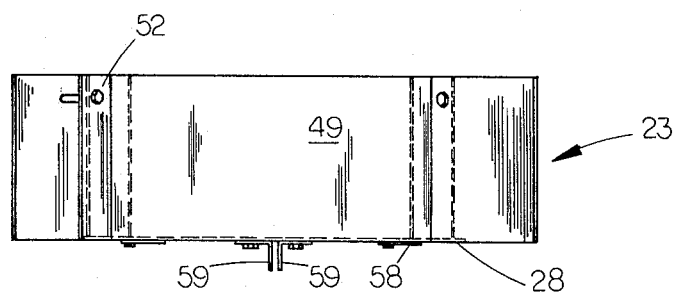
FIG. 4 is an elevational view of the spreader pan when removed from the invention and viewed along line 4—4 of FIG. 3.
Figure 5:
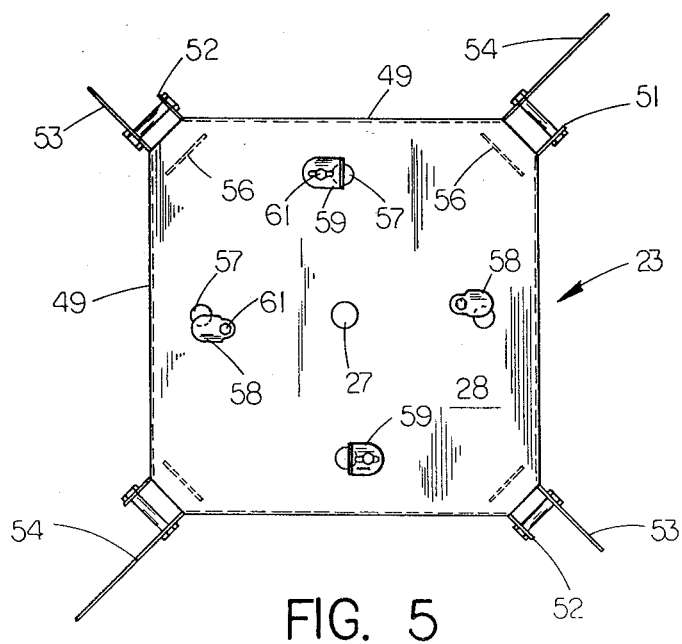
FIG. 5 is a bottom view of the spreader pan removed from the invention.

Referring now to FIGS. 3, 4 and 5, pan 23 is seen to comprise bottom 28 and four sidewalls 49. Sidewalls 49 each being shorter than each of the four sides of bottom 28 and centered thereon, leave outlets 51 in each corner of pan 23. Extending at 135° to the sidewalls 49 from each end thereof are restraining vanes of varying length. These vanes serve to restrain the material as it leaves outlets 51 in the direction of spin, thereby increasing the horizontal velocity of material which passes through outlets 51 to broadcast it a further distance proportionate to the length of the vanes. Short vanes 52 are located at the leading side of each outlet 51 as the pan spins counter-clockwise viewing it from above. Two medium length vanes 53 are on the other sides of two outlets 51 directly opposite each other and two long vanes 54 are opposite each other on the remaining two sides of outlets 51. Thus, when the pan is rotated counter-clockwise, short vanes 52 will allow material to exit the openings with little increased horizontal velocity and when the motor 32 is reversed, medium length vanes 53 and long vanes 54 will further increase the horizontal composite velocity of the material, proportionate to their length, for greater spread.

As can be seen in FIGS. 3, 4, 5, and 6, vertical baffles 56 are affixed to bottom 28 at a right angle to vanes 52, 53 and 54 and are spaced slightly inwardly from sidewalls 49. Baffles 56 aid sidewalls 49 in reducing the horizontal momentum of the entering grain, thus confining the grain a greater amount of time in pan 23 before it is thrown. This characteristic tends to keep the material present in pan 23 in a substantially level configuration, which results in the quantity of material reaching and exiting through each outlet 51 being substantially equal, regardless of how and where the material entered and was deposited in pan 23.

For further maintenance of the even radial distribution of the material within the bin, pan bottom 28 in this embodiment contains four secondary outlets 57 for distribution of material in a substantially vertical direction (see FIGS. 3 and 5). To control the amount of material which exits secondary outlets 57, two opposing pivot covers 58 are releaseably bolted to the underside of pan 23 adjacent to two secondary outlets 57 and two slide deflectors 59 are releaseably bolted to the underside of pan 23 to the other two opposing secondary outlets 57 by screw and nut sets 61. As can best be seen in FIG. 5, slide deflectors 59 have a vertical portion depending therefrom which depresses the horizontal throw when the spreader is rotated in the direction wherein outlets 57 lead deflectors 59. In this embodiment this result is obtained when the spreader is rotating counter-clockwise and short vanes 52 are controlling the throw through outlets 51.

Figure 7:
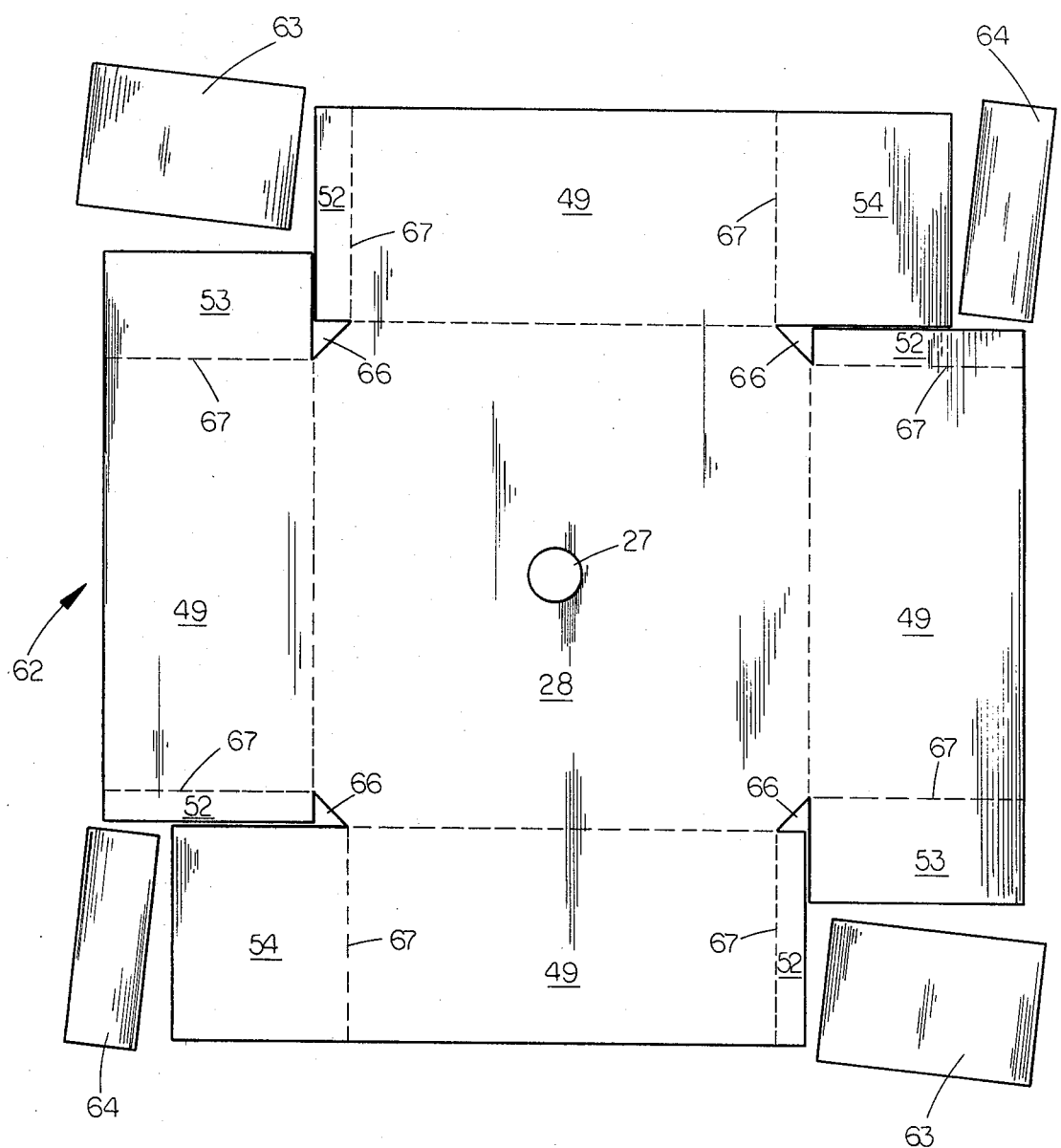
FIG. 7 is a plan view of a piece of material showing where it is cut and folded to form the spreader pan.

An additional advantage of my spreader is that it lends itself to economic manufacture by virture of its shape. As can be seen by reference to FIG. 7, pan 23 can be fabricated from a single square piece of material 62. The boundaries of bottom 28 are located the desired distance from the extremeties of single piece of material 62 in consideration of the desired size of bottom 28 and height of sides 49, bottom 28 being centered within single piece of material 62 and its four sides being parallel to the four sides thereof. Rectangular sections 63, located in opposing corners of piece of material 62, its long dimension equal to the height of side 49, are then cut from piece of material 62. Rectangular sections 64 also having a long dimension equal in size to the height of side 49 and a short dimension shorter than that of rectangular sections 63, are cut from the remaining two corners of piece of material 62. Next the cut creating the long dimension of each of the rectangular sections 63 and 64 is extended past the four corners of pan bottom 28 a short distance. At the end of that short distance, the small 45° triangle 66 is removed from each of the four corners of pan bottom 28. It is now possible to form pan bottom 28 by folding the material extant said bottom upwardly to a vertical position. It is then possible to form sides 49 by bending that portion of each of the four vertical segments which now extend beyond 45° triangles 66 outwardly at an angle of 135° to what will then become side 49, said foldlines being indicated on FIG. 7 at 67. Rectangles 63 and 64 are then available to use for vertical baffles 56, pivot corners 58 and slide deflectors 59.

Obviously, many modifications and variations of the present invention are possible in light of the above teachings. It is therefore to be understood that, within the scope of the appended claims, the invention may be practised otherwise than as specifically described.

I claim:

1. A material spreader comprising:
    a funnel-shaped chute for receiving gravity fed material and directing it downwards and having a shaft depending therefrom;
    a pulley rotated spreader pan rotatably secured to said shaft, having a bottom substantially square in shape with rectangular side walls affixed normal to each side of said bottom with their long sides slightly shorter than and centered upon each of said sides of said bottom, whereby material entering said chute with a substantial horizontal element to its path of flight and retaining said horizontal element as it initially accumulates in said pan will remain there a sufficient length of time to abort its horizontal momentum before being ejected through the four vertical openings between said four rectangular side walls; and,
    power means for rotating said pulley rotated spreader pan about said shaft.

2. The material spreader as defined in claim 1 further comprising:
    means for changing the rotational speed of the spreader pan in order to vary the distance of throw.

3. The material spreader as defined in claim 1 further comprising vanes adjacent said outlets for increasing the distance of throw.

4. The material spreader of claim 1 wherein said spreader pan is further characterized by having secondary outlets in its bottom.

5. The material spreader as defined in claim 4 further comprising means for adjusting the size of said secondary outlets.

6. The material spreader as defined in claim 4 further comprising means for deflecting the material exiting from the secondary outlets.

7. A material spreader comprising:
    a funnel-shaped chute for receiving gravity fed material and directing it downwards and having a shaft depending therefrom;
    a pulley rotated spreader pan means for substantially stopping said material before it is thrown, rotatably secured to said shaft having sidewalls with outlets for dispersing said material;
    power means including an electric motor mounted to the outside of the chute with its drive shaft depending vertically therefrom, said drive shaft having pulley and belt means for transmitting power to said pulley rotated spreader means; and,
    means for changing the rotational speed of the spreader pan, including a drive pulley complex having different sized pulleys and means for changing the position of the drive pulley complex, vertically and horizontally, whereby the pulley rotated spreader pan is turned by a different sized drive pulley in order to vary the distance of throw.

8. A material spreader comprising:
    a funnel-shaped chute for receiving gravity fed material and directing it downwards and having a shaft depending therefrom;
    a pulley rotated spreader pan means for substantially stopping said material before it is thrown, rotatably secured to said shaft having sidewalls with outlets for dispersing said material;
    reversible power means for rotating the said pulley rotated spreader pan about said shaft; and,
    vanes adjacent said outlets for increasing the distance of throw, said vanes being of shorter length on the counterclockwise side and of longer length on the clockwise side.

9. A material spreader comprising:
    a funnel-shaped chute for receiving gravity fed material and directing it downwards and having a shaft depending therefrom;
    a pulley rotated spreader pan means for substantially stopping said material before it is thrown, rotatably secured to said shaft having sidewalls with outlets for dispersing said material;
    power means for rotating the said pulley rotated spreader pan about said shaft; and,
    baffling means attached to the bottom of said pan means for reducing the horizontal momentum of the material.

10. The material spreader of claim 9 wherein said baffling means are further characterized by being located near each outlet.

11. A material spreader comprising:
    a funnel-shaped chute for receiving gravity fed material and directing it downwards and having a shaft depending therefrom;
    a pulley rotated spreader pan means for substantially stopping said material before it is thrown, rotatably secured to said shaft, said spreader pan having a square bottom, four vertical sides each of lesser length than the sides of the square bottom and centered thereon in order that four outlets will be located at the corners of the square bottom for dispersing said material; and,
    power means for rotating the said pulley rotated spreader pan about said shaft.

* * * * *